April 29, 1952   G. R. GREENSLADE   2,595,135
SHOCK-ABSORBING SUSPENSION FOR INSTRUMENTS OR THE LIKE
Filed Aug. 12, 1946
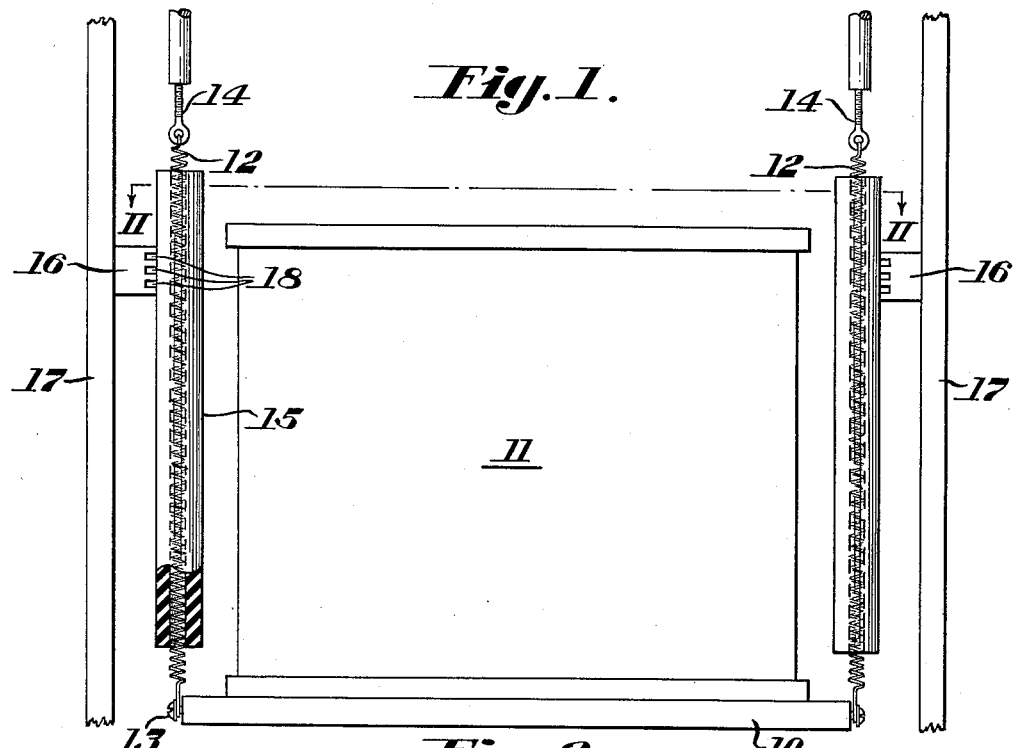
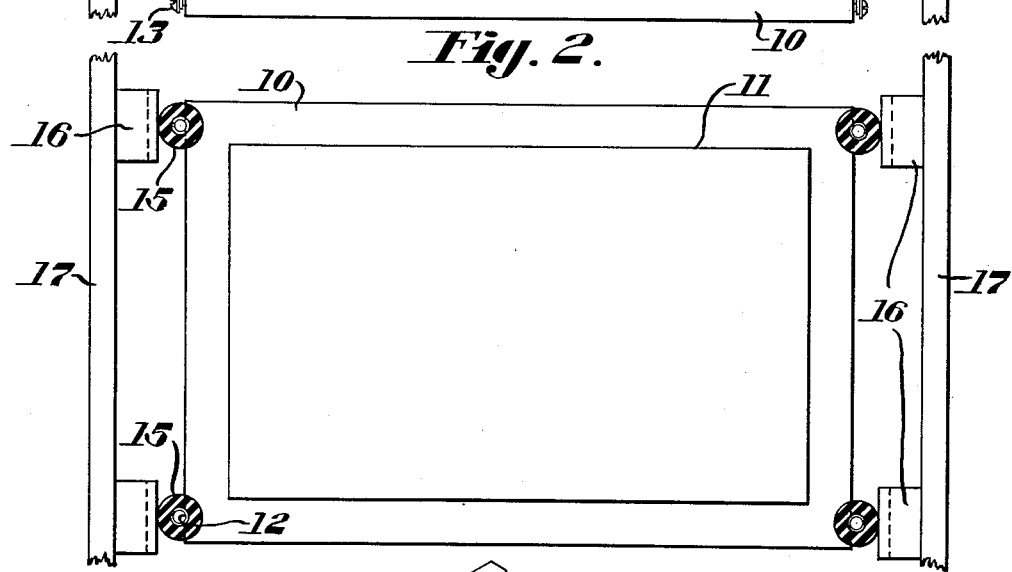
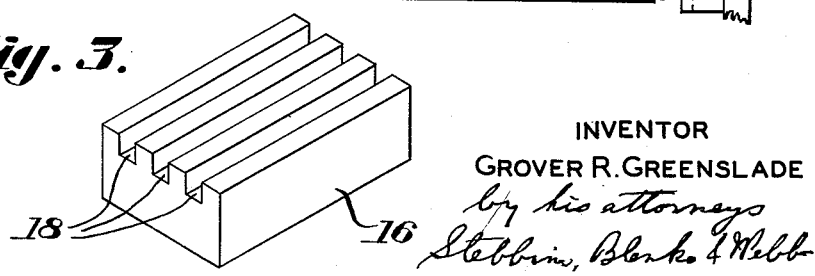
INVENTOR
GROVER R. GREENSLADE
by his attorneys
Stebbins, Blenko & Webb Patented Apr. 29, 1952

2,595,135

UNITED STATES PATENT OFFICE 2,595,135

SHOCK-ABSORBING SUSPENSION FOR INSTRUMENTS OR THE LIKE

Grover Rawle Greenslade, Scott Township, Allegheny County, Pa., assignor to Flannery Bolt Company, Bridgeville, Pa., a corporation of Delaware Application August 12, 1946, Serial No. 689,994

4 Claims. (Cl. 248—18)

This invention relates to a suspension for supporting delicate instruments or the like which are apt to be damaged by shock or have their accuracy impaired by vibration.

Various types of apparatus, particularly delicate electrical apparatus, are subject to the danger of injury resulting from shock and require vibrationless support in order to give accurate readings. One example of such apparatus is the D'Arsonval galvanometer, the movement of which is mounted on a suspending filament. Various types of mountings for such instruments have been known heretofore but none of them, so far as I am aware, has been capable of entirely eliminating the effect of outside vibrations.

I have invented a novel suspension for instruments or the like affording a support therefor which not only prevents the instrument from being subjected to shock but also damps any incident vibrations so rapidly as to prevent them from seriously interfering with the use or accuracy of the instrument. In a preferred embodiment, I provide an instrument mounting comprising a base having suspension springs. Each spring is provided with a snug-fitting sleeve of rubber-like material which damps longitudinal vibrations of the spring. In addition, I provide buffers or frictional pads laterally engaging the sleeves which further aid in damping longitudinal vibrations and cushion any transverse movement thereof.

For a complete understanding of the invention, reference is made to the accompanying drawings which illustrate a preferred embodiment of the invention. In the drawings, Figure 1 is a side elevation;

Figure 2 is a horizontal section taken along the plane of line II—II of Figure 1; and Figure 3 is a perspective view of a friction pad.

Referring in detail to the drawings, my suspension comprises a base 10 adapted to accommodate an instrument or other piece of apparatus 11 which it is desired to protect from shock and vibration such as a galvanometer of high accuracy. The base 10 is supported by a plurality of coil springs 12, preferably one at each corner of the base 10. The lower ends of the springs may be hooked over screws 13 extending into the base. The upper ends are preferably secured to adjusting or levelling links 14 depending from a supporting panel, such as the top of a cabinet or enclosing case. The panel, of course, will be provided with an opening to permit the galvanometer movement to be viewed from above.

The springs 12 are provided with sleeves 15 of rubber or like material. The sleeves have a bore therethrough somewhat less than the outside diameter of the springs when loaded, whereby a snug fit is obtained. The resulting friction tends to damp longitudinal vibrations of the springs. Thus if the base 10 is set into vertical vibration by any cause, the sleeves 15 check it almost immediately. Without the sleeves, the vibration would continue almost indefinitely since the springs are highly elastic. The elasticity of the spring suspension, however, is desirable in preventing shocks applied to the supporting panel or enclosing case from reaching the instrument 11 on its support 10.

Friction pads 16 have lateral engagement with the sleeves 15. As clearly shown in the drawings, one of the pads 16 is mounted on the enclosing cabinet or case indicated at 17 adjacent each of the suspending springs and in proper relation to have frictional wiping engagement with the sleeve thereof. The pads 16 are of rubber or like material, preferably sponge rubber, and their contacting faces have spaced grooves 18 therein forming separate ribs which actually make contact with the exterior of the sleeves 15. The pads are installed so that the ribs extend horizontally, i. e., transversely to the sleeves 15.

The pads 16 serve a two-fold purpose. In the first place, they aid in checking longitudinal vibrations of the suspending springs. They also resiliently confine the suspension as a whole, permitting cushioned or frictionally restrained lateral movement thereof to a very limited extent, thus damping any transverse vibrations.

It will be apparent from the foregoing description that the invention provides a mounting well adapted for sensitive instruments. The support which accommodates the instrument or other apparatus is well cushioned in all directions. In fact, it approaches a freely floating condition as nearly as possible in practice. At the same time, any vibration which might be set up in the support is damped almost immediately so that it does not cause a prolonged interference with the use of the instrument.

Although I have illustrated and described but a preferred embodiment of the invention, it will be recognized that changes in the details of construction may be made without departing from the spirit of the invention or the scope of the appended claims.

I claim:

1. A shock-absorbing suspension comprising a supporting base, a plurality of coil-springs extending under tension upwardly therefrom to suspend it, each spring under tension having a sleeve of rubber-like material snugly fitted thereon, and a fixed friction pad of highly elastic material engaging each of said sleeves, the contacting surfaces of said pads having spaced grooves forming separate ribs extending transversely of said sleeves.

2. A shock-absorbing suspension comprising a supporting base, a plurality of yielding members secured to said base and extending upwardly therefrom under tension to suspend it, friction sleeves of rubber-like material fitting snugly on said members under tension, and damping pads of highly elastic material engaging said sleeves frictionally, the contacting surfaces of said pads having spaced grooves forming separate ribs extending transversely of said sleeves.

3. In a shock-absorbing suspension, the combination with spaced suspension springs under tension and each having a resilient sleeve snugly fitted thereon, of a friction pad of highly elastic material engaging each sleeve, said pads having ribs on their contacting surface extending transversely of said sleeves.

4. In a shock-absorbing suspension, the combination with spaced resiliently hangers, of a friction pad engaging each of said hangers laterally to damp longitudinal vibrations thereof, said pads having spaced ribs on their contacting surfaces extending transversely of the hangers.

GROVER RAWLE GREENSLADE.

REFERENCES CITED

The following references are of record in the file of this patent:

UNITED STATES PATENTS

| Number | Name | Date |
| --- | --- | --- |
| 1,766,597 | Bushnell | June 24, 1920 |
| 2,005,089 | Krebs | June 18, 1935 |
| 2,442,355 | Greenslade | June 1, 1948 |

FOREIGN PATENTS

| Number | Country | Date |
| --- | --- | --- |
| 644,478 | Germany | May 5, 1937 |